Nov. 11, 1969          A. MARIN A.          3,477,414
               ROTARY FLUID-HANDLING MECHANISM
Filed Dec. 15, 1967                    6 Sheets-Sheet 3

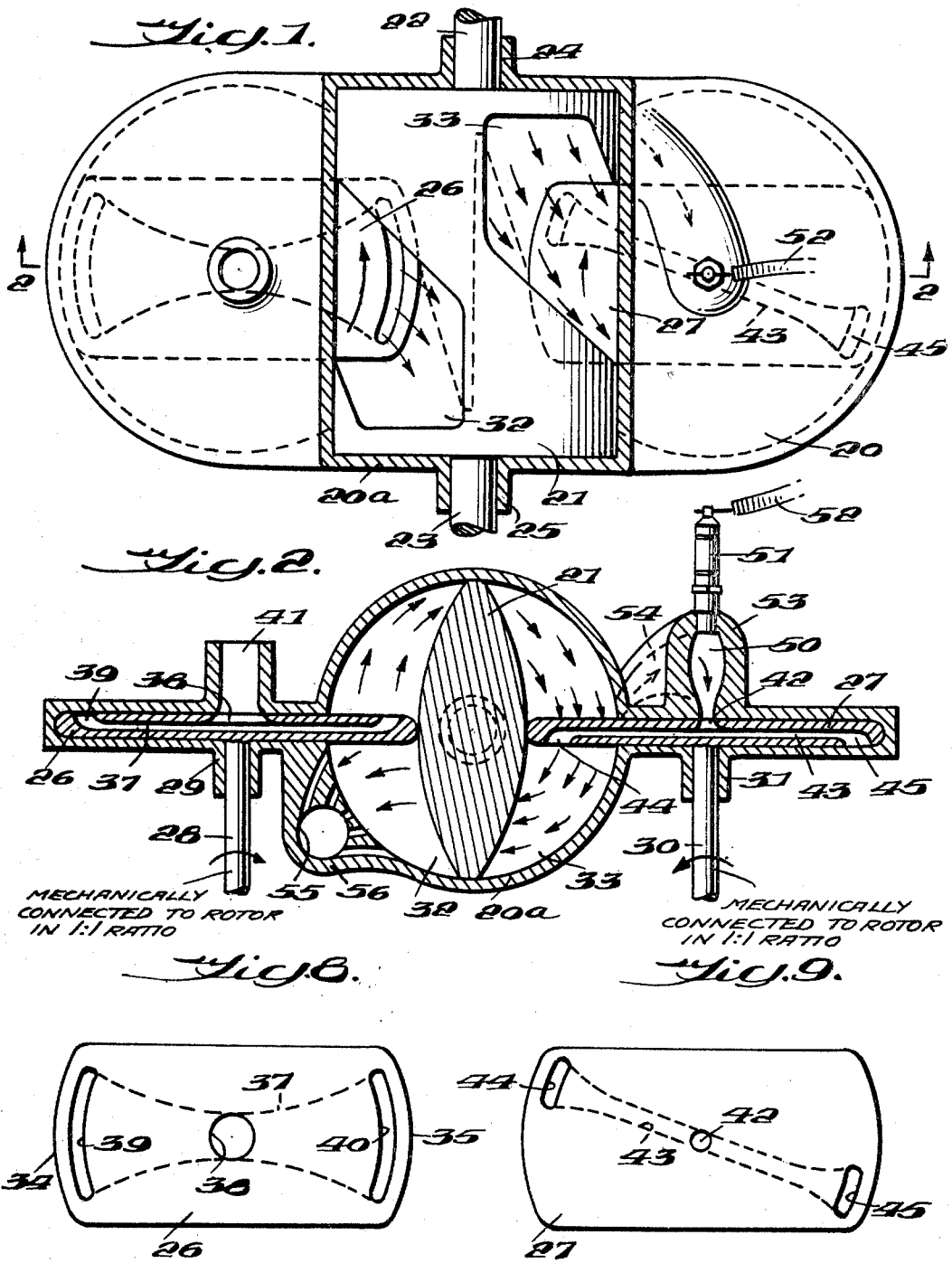

INVENTOR:
ALVARO MARIN A.
BY Mallinckrodt and Mallinckrodt
ATTORNEYS

Nov. 11, 1969
A. MARIN A.
3,477,414
ROTARY FLUID-HANDLING MECHANISM
Filed Dec. 15, 1967
6 Sheets-Sheet 4
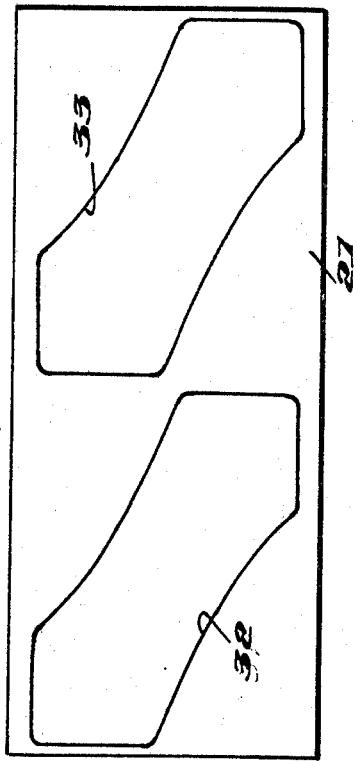
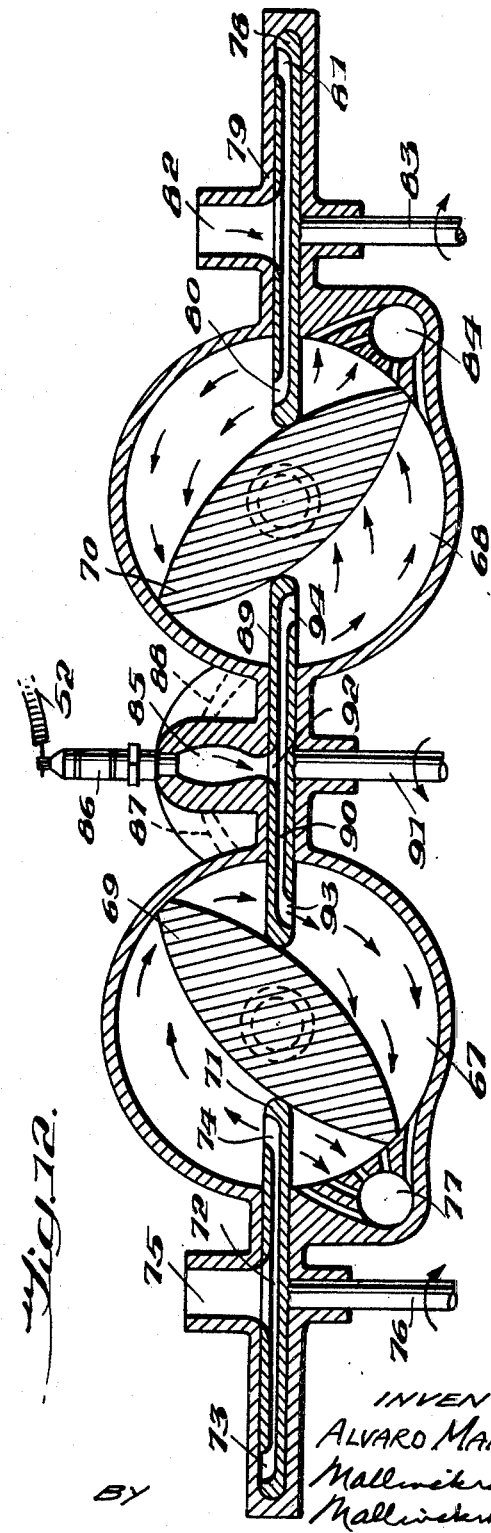
INVENTOR:
ALVARO MARIN A.
BY Mallinckrodt and Mallinckrodt
ATTORNEYS

United States Patent Office 3,477,414
Patented Nov. 11, 1969

3,477,414
ROTARY FLUID-HANDLING MECHANISM
Alvaro Marin A., Juan Palan 1845, Santiago, Chile
Filed Dec. 15, 1967, Ser. No. 691,018
Int. Cl. F02b 53/06; F01c 1/08, 3/00
U.S. Cl. 123—13                                    9 Claims

ABSTRACT OF THE DISCLOSURE

A mechanism which effects a repeated and rapid variation in volume of gases from a low figure up to a maximum and back again, principally by means of three rotary elements, permitting high speed operation substantially free of vibration. The mechanism may be an integral part of an internal combusion engine or it may be driven by another engine in order to compress gases or pump fluids.

---

This invention relates to improvements in mechanisms of the type which control the flow of gases, effecting an intake, compression, expansion and exhaust, such as is characteristic of internal combustion engines. The invention provides a mechanism of few parts, rotatable at high speeds, and may be a built-in part of an internal combustion engine or it may be power-driven from an external source to compress air and other gases or to pump fluids. As the parts are few and operate at high speeds, the efficiency of the mechanism—the output for a given weight—is quite high: this is a major object of the invention.

In the accompanying drawings forming a part of this specification,

FIG. 1 is a diagrammatic top plan view of the mechanism, with a part in section, showing the direction of rotaton of certain parts by means of arrows, and indicating the flow of the gases by means of shorter arrows.

FIG. 2 is a diagrammatic cross section approximately on line 2—2 of FIG. 1.

FIG. 7 is a layout or view of the surface of the cylindrical rotor as it would appear if made a plane surface, thus showing the relative positions of the two rotor cavities.

FIG. 8 is a top plan view of one of the blades of FIGS. 1 and 2, which while rotating enters one cavity in the rotor and then withdraws from it.

FIG. 9 is a bottom plan view of the other blade of FIGS. 1 and 2, which while rotating enters the other cavity in the rotor and then moves out of it.

FIG. 12 is a sectional view like FIG. 2 but of another modification.

FIG. 13 is a view like FIG. 1 showing still another modification.

FIG. 14 is a view like FIG. 2 but illustrating the modification of FIG. 13.

Figure 3:
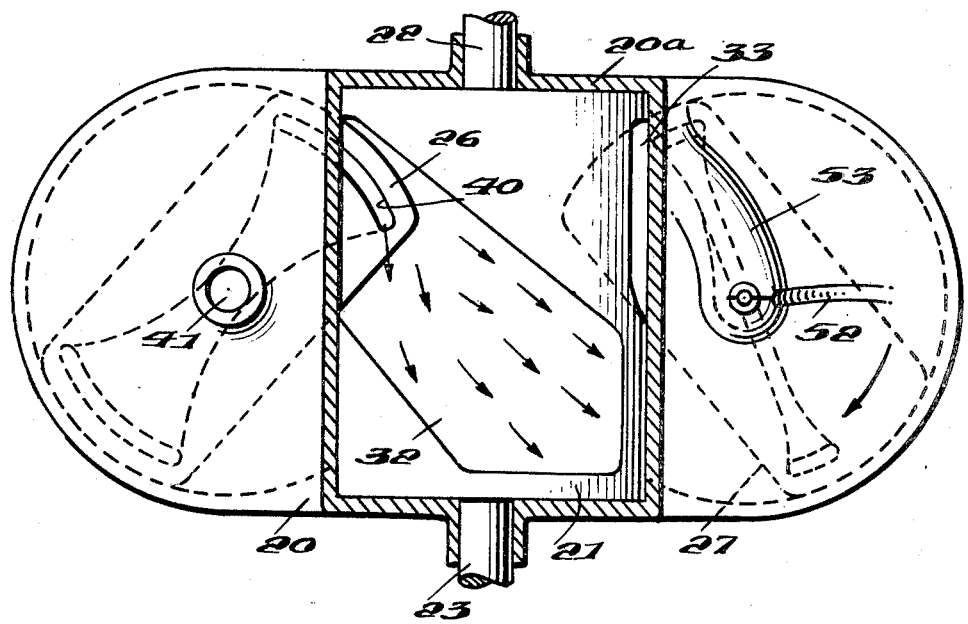
FIG. 3 is a view like FIG. 1 but showing different positions of the rotary elements.
Figure 4:
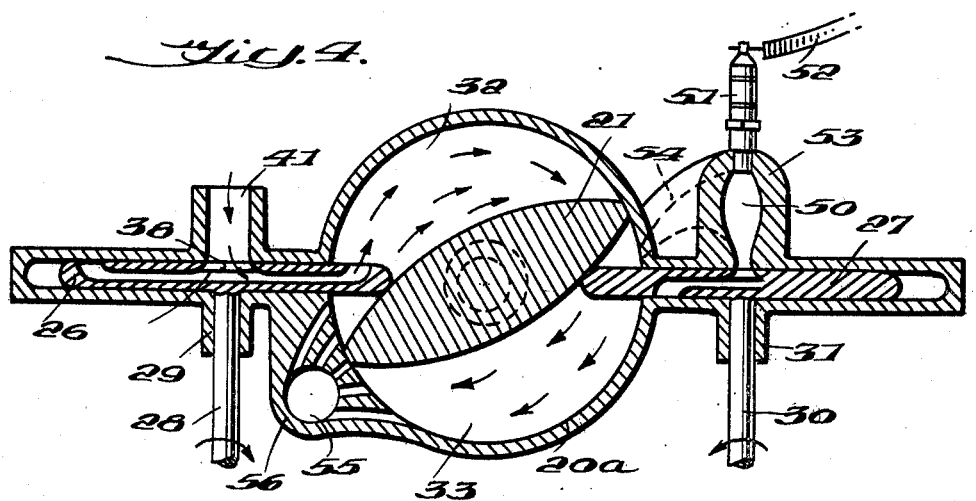
FIG. 4 is a view like FIG. 2 but showing the rotary elements in the positions of FIG. 3.
Figure 5:
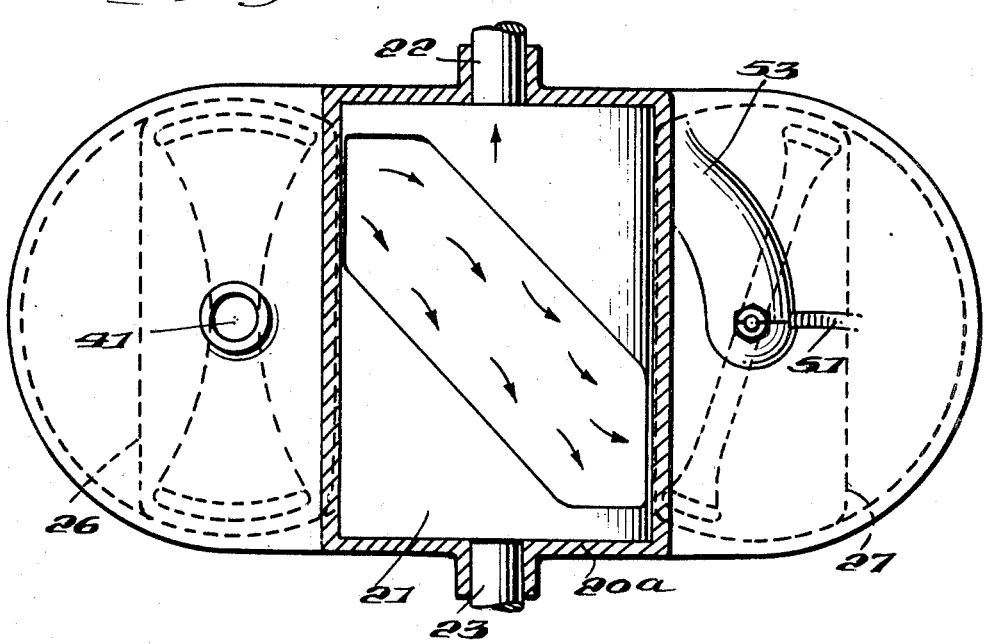
FIG. 5 is a view like FIG. 1 but showing the rotary elements in further advanced positions.
Figure 6:
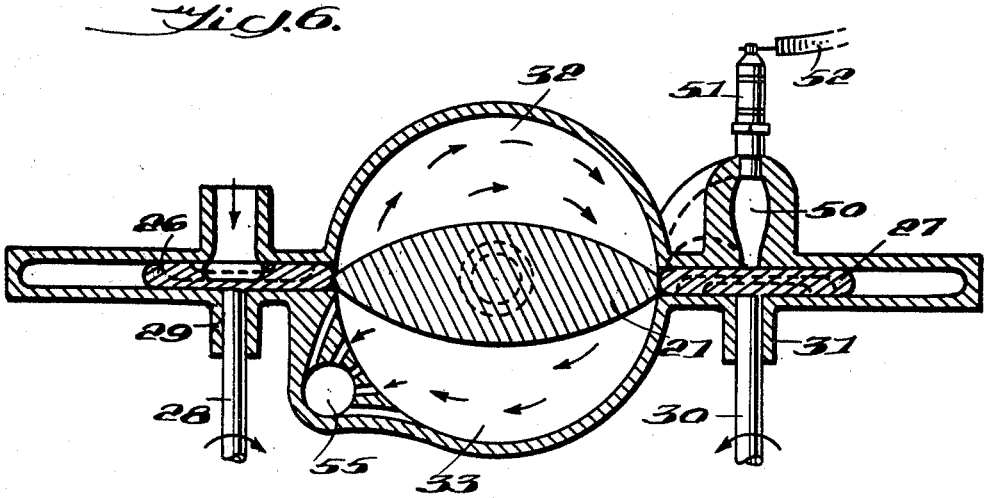
FIG. 6 is a view like FIG 2 but showing the rotary elements in the positions of FIG. 5.

The construction of FIGS. 1–9 will first be described. Here an internal combustion engine embodying the invention is diagrammatically shown. The mechanism includes a casing 20, a rotor 21 rotatable within a cylindrical portion 20ª of the casing, the rotor having shaft extensions 22 and 23 which rotate in bearings 24 and 25 respectively, provided on the casing. Blades 26, 27 are rotatably supported on opposite sides of the casing to revolve on parallel axes which are precisely at right angles to the axis of rotation of the rotor 21. The left hand blade 26 of FIGS. 2, 4 and 6 has a shaft 28 fixed thereto which rotates in a bearing 29 mounted on the casing 20. The right hand blade 27 (of the same figures) has a shaft 30 which rotates in a bearing 31 also fixed to the casing. As the legends of FIG. 2 state, shaft 28 is mechanically connected to the rotor shaft 23 in a 1:1 ratio so as to be rotated clockwise, while shaft 30 is mechanically connected to the same rotor shaft 23 in a 1:1 ratio to be rotated counterclockwise. The mechanical connections are not shown but are readily comprehended by anyone skilled in the art. Such well known power transmission systems as gears and shafts or sprocket wheels, chains and shafts may be used. The essential requisite is the 1:1 ratio of the transmissions, as the blades 26, 27 enter and withdraw from the rotor cavities 32, 33 respectively during operation of the mechanism.

The relative positions of the cavities 32, 33 is best shown in FIG. 7. Their centers are 180° apart. Each blade as it rotates maintains its inner end in substantial contact with the inner walls of the cavity, as the drawings indicate. To make this a sealing contact, the ends of the blades will carry seals, in function similar to piston rings, but not illustrated. The rotor must also have sealing contact with the cylindrical surface within which it revolves.

Blade 26, shown per se in FIG. 8, has arcuate ends 34, 35 for said sealing contact and the arcs of said ends have their centers at the axis of rotation of the blade. Shaft 28 is fixed to the blade at said axis (FIG. 2) and extends downwardly through the casing and outside for a connection with the transmission system previously mentioned. Blade 26 is hollow, that is, has an interior channel 37 for the flow of gases which extends for nearly the entire length of the blade. At its center, on the top, blade 26 has a circular opening or inlet 38 which admits fluids to channels 37. The longitudinal axis of channel 37 preferably substantially coincides with the longitudinal axis of the blade, as seen in FIG. 8. From inlet 38 the channel widens laterally in curved lines in each direction and terminates in relatively large arcuate discharge ports 39, 40 spaced slightly from the arcuate ends, 34, 35, respectively. The arrangement permits the intake of gases during the entire intake interval, which is about one-half of a revolution of the rotor. Casing 20 has an inlet 41 which conducts fluids to the blade inlet 38, thence to the channel 37. Thus air or other fluids may flow longitudinally through blade 26 and exit from either discharge port 39, 40 into the rotor cavity then entered by the rotating blade end.

Blade 27 (best shown in FIG. 9) although of the same dimensions as blade 26, is differently formed interiorly. At its top center blade 27 has an inlet 42 which is considerably smaller than inlet 38 of the blade 26. A channel 43, much narrower than channel 37, extends longitudinally in both directions from inlet 42, but the axis of channel 43 does not coincide with the longitudinal axis of the blade; instead, channel 43 is at an acute angle relative to said longitudinal axis. Channel 43 ends in two discharge ports 44, 45. As stated, blade 27 has a control shaft 30 fixed thereto which extends through the casing to a connection with the transmission system previously mentioned (see the legends in FIG. 2). The positions of discharge ports 44, 45 are determined by operating conditions: the expansion of gases must take place, then the scavenging of burnt gases, then the ports must be closed to permit the compression of a new combustible charge.

Located directly above the inlet 42 of blade 27 is a combustion chamber 50, and a spark plug 51 is screwed into the top of the combustion chamber so that its points may ignite a combustible charge. A wire 52 conducts electricity from a battery or other source of electrical energy (not shown) to the spark plug. The combustion chamber is provided within a bulbous enlargement 53 of the casing. A gas intake 54 connects the interior of the cylindrical portion 20a of the casing with the combustion chamber 50. An ignitable gaseous mixture can thus flow into the combustion chamber and be ignited by the spark plug; then an explosion takes place and the discharge or exhaust moves through the channel 43 of blade 27 and through an outlet to a rotor cavity, thence (as the rotor revolves) to an exhaust passage 55 provided in another bulbous enlargement 56 integral with the casing. From passage 55 the burned gases normally will be discharge to the atmosphere.

The flow of gases will be clear from the small arrows of FIG. 2 and the present description. The explosive mixture enters inlet 41, flows through channel 37 in blade 26, passes into the rotor cavity, and as the rotor turns, flows through intake 54 and is exploded in the combustion chamber, as already stated. However, when the rotor and blades are in the positions shown in FIGS. 5 and 6, no flow of gases can take place.

Another way of describing the cycle: A combustible charge enters a cavity (one-half turn of the rotor). The charge is precompressed in this cavity and then it is transferred and fully compressed in the chamber of combustion (in the next one-half turn of the rotor). The charge explodes and expands in the other cavity of the rotor: the cavity that is following the one where intake and compression had taken place before. This takes another one-half turn of the rotor. Finally, the burnt charge is exhausted (another one-half turn of the rotor). As a consequence, it takes four half turns or two turns of the rotor for a charge to perform the complete cycle. In each half turn of the rotor, the four operations (intake, compression, expansion and exhaust) are taking place, each one belonging to a different combustible charge. One can appreciate from the drawings that the blades divide the cavities into four spaces and in each of them at any given moment a different operation takes place. The performance of the mechanism yields, as a consequence of what has been stated, four explosions for each four half turns of the rotor.

Figure 10:
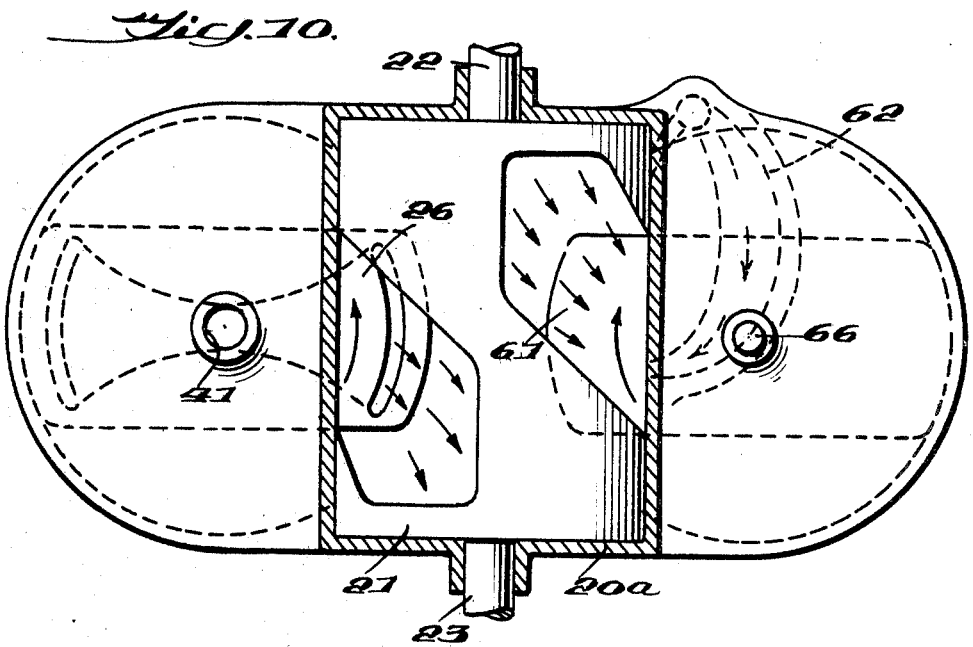
FIG. 10 is a view like FIG. 1 but showing a modification.
Figure 11:
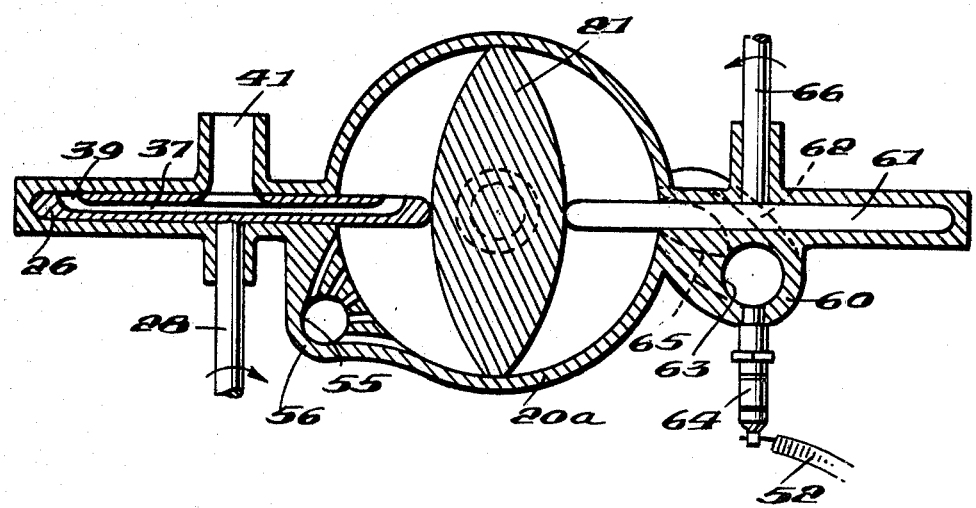
FIG. 11 is a view like FIG. 2 but showing the modification of FIG. 10.
Figure 73:
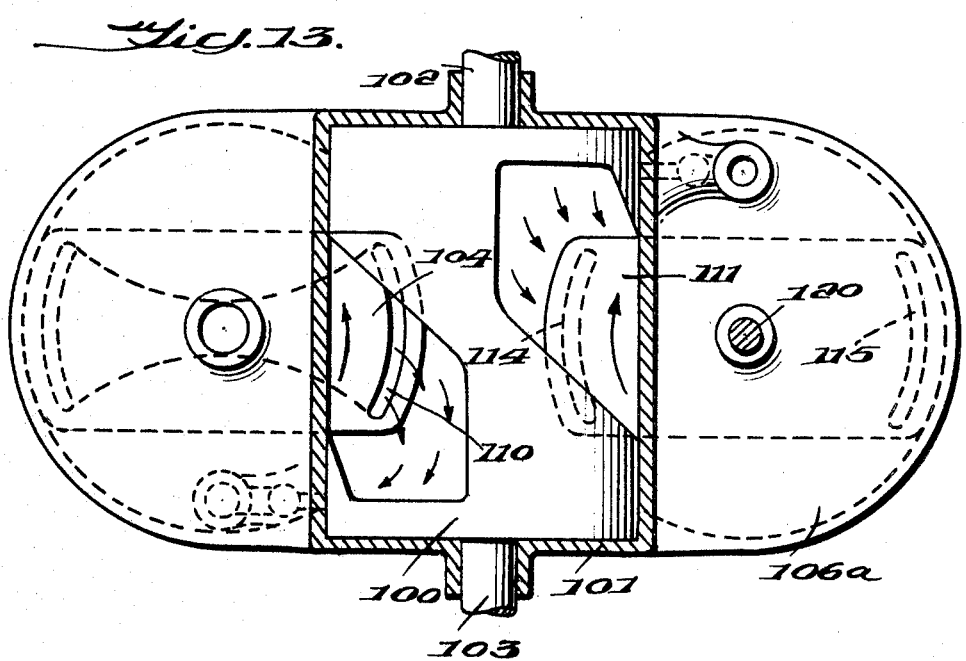
Figure 74:
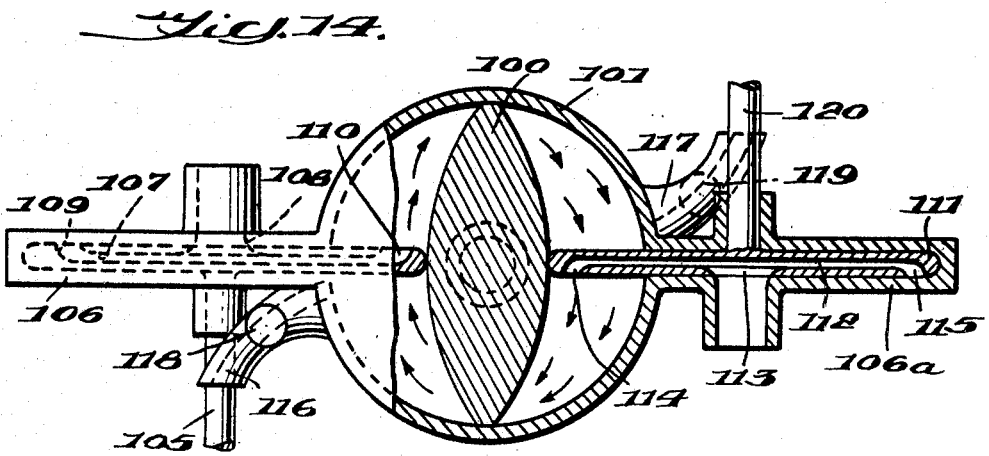

Referring now to FIGS. 10 and 11 which show a slightly modified form of engine, the bulbous enlargement 60 on the casing is placed below the blade 61, which has no channel for the gases. An inlet passage 62 for the explosive mixture leads to the combustion chamber 63 having a spark plug 64. After an explosion the gases flow through an outlet passage 65 to a cavity in the rotor. Blade 61 has its shaft 66 extending upwardly, and like blade 27, it will have a 1:1 turning ratio with the rotor 21. During the expansion process the intake passage 62 must be closed so that there is no pressure loss in the chamber. This closing may be effected by using a partial ring (not shown) mounted on the rotor, so placed as to stop gas flow momentarily into inlet 62. The other parts being the same as in FIGS. 1 and 2 are designated by the same reference numerals.

Reference should now be made to FIG. 12, showing a tandem arrangement. Here the casing includes two cylindrical cavities 67, 68 in which are rotors 69, 70 respectively. The left hand cavity 67 receives a rotary blade 71 which is like blade 26, having a channel 72 and discharge ports 73, 74 at either end of the channel. An inlet 75 admits an explosive mixture to a mid-point in channel 72, and a shaft 76 is fixed to blade 71 and is connected to a mechanism to cause rotation thereof in a 1:1 ratio to the rotation of rotor 69. There is an exhaust passage 77 taking the exhaust gases out of cavity 67. At the right side, cavity 68 receives a rotary blade 78 which has a channel 79 and discharge ports 80, 81. An inlet 82 conducts an explosive mixture to the center of channel 79 and a shaft 83 is fixed to blade 78. An exhaust passage 84 receives the exhaust gases from cavity 68. The combustion chamber 85 is located between the cavities 67, 68 and is provided with a spark plug 86. Inlet passages 87, 88 admit the unburned gases from the cavities on opposite sides to the explosion chamber 85. A blade 89 having a channel 90 is rotated by a shaft 91 below the combustion chamber 85. Blade 89 is like blade 27, having a channel with an inlet 92 at its center and outlets 93, 94 at either end which discharge the burned gases to the rotor's cavities simultaneously. As the arrows indicate, if blade 71 rotates clockwise, blade 78 will be rotated clockwise also, while blade 89 will be rotated counterclockwise, and all three blades turn on axes which are parallel and at right angles to the axes of the rotors 69, 70. As the gaseous mixtures are fed to the combustion chamber 85 from both sides alternately, the rotation of the rotors 69, 70 and their cooperating blades 71, 78 will only be one-half as fast as the rotation of the corresponding parts of FIGS. 1 and 2, to yield the same power output. The alternative disposition of the combustion chambers and passages leading thereto which is illustrated in FIG. 11 can be employed in the modified arrangement of FIG. 12.

FIGS. 13 and 14 show still another arrangement of elements. Here there is no explosion chamber. A rotor 100, like the rotors previously described, rotates in a cylindrical chamber 101 and has shaft extensions 102, 103 at either end. A blade 104 like blade 26 has a shaft 105 and rotates in an extension or wing 106 of the chamber 101, the axis of rotation being at right angles to the axis of rotor 100. Blade 104 has a gas channel 107, a gas inlet 108 at its center, and gas discharge ports 109, 110 at the ends of the channel. Another blade 111 on the opposite side, and rotatable in a wing 106a of the chamber 101, has a gas channel 112 and a central inlet 113 and discharge ports 114, 115 at the ends of said channel. It will be noted that the inlet 113 is on the underside of blade 111 and that the discharge ports 114, 115 discharge downwardly, as the parts are viewed in FIG. 14. Thus the gas inlet provided in the casing is on the underside for blade 111, the opposite of the arrangement for blade 104. The cylindrical chamber 101 has two outlets or passages 116, 117 on opposite sides simultaneously receiving the gases discharged from the corresponding rotor cavities. The blades 104, 111 are rotatable by shafts 105, 120 respectively which extend in opposite directions but are parallel. As said shafts are rotated at the same speed as the rotor, which is power-driven, the discharged gas will be merely compressed gas, not a mixture of burned gases, as in the earlier described forms. The two outlets 116, 117 may then be connected by tubes or pipes (not shown) to a gas cylinder to store the compressed gas.

While several embodiments of the invention have been described in some detail, it is obvious that the invention is not limited to the described forms and that other constructions and arrangements of parts may be made in accordance with the invention, the scope of which is defined by the following claims.

What is claimed is:

1. A mechanism of the character described, comprising a casing having a cylinder and an exhaust passage for gases leading from the cylinder; a cylindrical rotor supported for rotation in the cylinder, said rotor having two mutually similar cavities which open outwardly and have centers 180° apart; a pair of elongated blades mounted for rotation on their centers at opposite sides of said rotor, said blades being rotatable about respective parallel axes which are at right angles to the axis of rotation of the rotor, and each blade being so shaped and mounted that an end thereof enters one of the cavities and withdraws completely therefrom during each one-half revolution, said blades being momentarily aligned axially during each half revolution and, when within the respective cavities, having gas-tight contact at their end edges with the walls of said cavities; means connecting the blades with the rotor so that the blades rotate in opposite directions at precisely the same r.p.m. as the rotor; a gas inlet for admitting gases to the interior of one blade, which blade has an internal longitudinal channel for said gases with gas discharge ports at opposite ends of the channel, so that gases are discharged from said blade into the cavity entered thereby; means closing the discharge port that is outside the said cavity as the said one blade rotates; and means for admitting gases to the other cavity as the rotor rotates, the said cavities discharging the gases through said exhaust passage in the casing, as the rotor rotates.

2. The invention defined in claim 1, wherein the casing is provided with a combustion chamber having means for introducing a combustible gas mixture thereinto; means for installing a spark plug in the combustion chamber for firing said gas mixture therein; the second blade having a central inlet in communication with the combustion chamber for receiving the gases ignited in said cumbustion chamber and having a longitudinal gas channel open to said central inlet with discharge ports for said channel at opposite ends thereof; and means closing the discharge port of said second blade that is outside the cavity entered by said second blade as the rotor rotates.

3. The invention defined in claim 2, wherein the longitudinal gas channel of the second blade is substantially narrower than the channel of the first-named one blade and is straight and extends at an acute angle to the longitudinal axis of said second blade, the longitudinal channel of the said first-named blade having its axis coinciding with the longitudinal axis of said blade.

4. The invention defined in claim 2, wherein for each blade the means closing the discharge port that is outside the casing as the rotor rotates is a wing extension of said casing, within which the blade is rotatably mounted in port-closing relationship with the walls thereof.

5. The invention defined in claim 4, wherein the casing defines a second cylinder at a side of one of the wing extensions and a third wing extension at the opposite side of said second cylinder, a second cylindrical rotor like the first-named being supported for rotation in said second cylinder and another blade like the first-named blade and the second blade being rotatably mounted in said third wing extension.

6. The invention defined in claim 1, wherein the casing is provided with a combustion chamber having an inlet for combustible gases; means for installing a spark plug in said combustion chamber so that a combustible mixture is fired when the plug is energized; and passage means in the casing leading from the combustion chamber to the cylindrical portion of the casing to discharge propulsive gases against the rotor.

7. The invention defined in claim 1, wherein there are two like rotors each with like cavities 180° apart, and two spaced apart cylinders in which the rotors rotate, respectively, and having respective discharge outlets for gases; there are between the two cylinders and at respective opposite sides thereof blades mounted for rotation in respective wing portions of the casing, each of which blades has a gas inlet leading into a longitudinal channel in the blade and having gas outlets at the opposite ends of said channel; a combustion chamber disposed between the two cylinders and having means for introducing a combustible gas mixture thereinto, means for discharging gases therefrom into the gas inlet of the blade between said cylinders, and means for installing a spark plug for igniting a charge of said gas mixture; the gas outlets of the blade between said cylinders being arranged to discharge the gases simultaneuosly into said cylinders prior to final discharge from the cylinder discharge outlets.

8. The invention defined in claim 1, wherein each blade has a gas inlet at the center thereof and an internal channel for gases with respective discharge outlets at opposite ends thereof; the rotor casing having on each side a valved outlet for discharge of gases; and wherein the blades have shafts which are parallel and extend outwardly from the casing in opposite directions, permitting power operation of the mechanism from an external source connected to the rotor, which is mechanically connected to said shafts.

9. The invention defined in claim 1, wherein the means closing the discharge port that is outside the casing as the rotor rotates is a wing extension of said casing within which the blade is rotatably mounted in port-closing relationship with the walls thereof.

References Cited

UNITED STATES PATENTS

| 904,749 | 11/1908 | Bender | 91—92 |
| 1,106,666 | 8/1914 | Miller. | |
| 1,332,468 | 3/1920 | Henig et al. | |
| 2,273,625 | 2/1942 | Concannon. | |

C. J. HUSAR, Primary Examiner

U.S. Cl. X.R.

91—92